US011625189B2

(12) United States Patent
Agarwal et al.

(10) Patent No.: US 11,625,189 B2
(45) Date of Patent: Apr. 11, 2023

(54) SYSTEMS AND METHODS FOR FRAGMENTATION MANAGEMENT IN HOST BUFFERS (71) Applicant: Western Digital Technologies, Inc., San Jose, CA (US)

(72) Inventors: Dinesh Kumar Agarwal, Bangalore (IN); Amit Sharma, Bengaluru (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/360,544

(22) Filed: Jun. 28, 2021

(65) Prior Publication Data
US 2022/0413751 A1 Dec. 29, 2022

(51) Int. Cl.
G06F 3/06 (2006.01)

(52) U.S. Cl.
CPC .......... *G06F 3/0656* (2013.01); *G06F 3/0619* (2013.01); *G06F 3/0638* (2013.01); *G06F 3/0679* (2013.01)

(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16;
(Continued)

(56) References Cited

U.S. PATENT DOCUMENTS 8,285,927 B2 * 10/2012 Flynn .................. G06F 12/0246
711/E12.019
8,725,931 B1 * 5/2014 Kang .................. G06F 13/1642
710/52
(Continued)

OTHER PUBLICATIONS

K. Kim, E. Lee and T. Kim, "HMB-SSD: Framework for Efficient Exploiting of the Host Memory Buffer in the NVMe SSD," in IEEE Access, vol. 7, pp. 150403-150411, 2019, doi: 10.1109/ACCESS.2019.2947350. (Year: 2019).*
(Continued)

*Primary Examiner* — Daniel C. Chappell
(74) *Attorney, Agent, or Firm* — Ravi Mohan; Rutan & Tucker, LLP (57) ABSTRACT

Storage devices can be configured to utilize one or more memory buffers located within a host-computing device. These host buffers may allow for faster access to some data, including control pages. However, host buffers are susceptible to fragmentation issues similarly to standard user memory arrays. As the data stored within the host buffers becomes more fragmented, performance can suffer. This performance loss in storage devices becomes more pronounced as the desired performance levels of these storage devices increase. Therefore, various methods and systems described herein manage fragmentation within host buffers by conducting one or more operations. These operations may include locating a continuous portion of allocated or unallocated memory within the host buffer and either swap or copy high-usage or high-priority data to those continuous portions. When continuous portions of host buffer memory
(Continued)

are not available, relevant portions of data may be cashed within the storage device to increase performance.

19 Claims, 7 Drawing Sheets

(58) Field of Classification Search
CPC ... G06F 13/00–4295; G06F 15/00–825; G06F 16/00–986; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06K 9/00–6298; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 27/00–3293; H01L 2225/00–1094; H03M 7/00–707; H04L 9/00–38; H04L 12/00–66; H04L 41/00–5096; H04L 49/00–9094; H04L 61/00–59; H04L 67/00–75
See application file for complete search history.

(56) References Cited

U.S. PATENT DOCUMENTS

| | | | |
|---|---|---|---|
| 9,563,382 B2* | 2/2017 | Hahn | G06F 3/0656 |
| 10,108,371 B2 | 10/2018 | Nimmagadda et al. | |
| 10,157,004 B2 | 12/2018 | Michaeli | |
| 10,372,378 B1* | 8/2019 | Benisty | G06F 3/0656 |
| 10,445,229 B1* | 10/2019 | Kuzmin | G06F 3/0659 |
| 10,712,949 B2 | 7/2020 | Hahn et al. | |
| 10,739,996 B1* | 8/2020 | Ebsen | G06F 16/1727 |
| 2010/0287217 A1* | 11/2010 | Borchers | G06F 12/0246 |
| | | | 711/E12.008 |
| 2010/0312983 A1* | 12/2010 | Moon | G06F 3/0679 |
| | | | 711/170 |
| 2011/0289267 A1* | 11/2011 | Flynn | G06F 3/0688 |
| | | | 711/E12.019 |
| 2016/0026406 A1* | 1/2016 | Hahn | G06F 12/0246 |
| | | | 711/103 |
| 2016/0299688 A1* | 10/2016 | Devendrappa | G06F 3/0655 |
| 2017/0068451 A1* | 3/2017 | Kenan | G06F 3/0659 |
| 2017/0220292 A1 | 8/2017 | Hashimoto | |
| 2017/0228191 A1* | 8/2017 | Sun | G06F 3/0611 |
| 2017/0286286 A1* | 10/2017 | Szubbocsev | G06F 12/0246 |
| 2018/0107593 A1* | 4/2018 | Ogawa | G06F 13/10 |
| 2018/0173461 A1* | 6/2018 | Carroll | G06F 3/0656 |
| 2019/0138499 A1* | 5/2019 | Dryfoos | G06F 16/215 |
| 2020/0012595 A1 | 1/2020 | Bordia et al. | |
| 2020/0334159 A1 | 10/2020 | Lee et al. | |
| 2020/0401515 A1* | 12/2020 | Liang | G06F 12/0253 |
| 2022/0019364 A1* | 1/2022 | Nair | G06F 3/0607 |

OTHER PUBLICATIONS

J. Hong, S. Han and E.-Y. Chung, "A RAM cache approach using host memory buffer of the NVMe interface," 2016 International SoC Design Conference (ISOCC), 2016, pp. 109-110, doi: 10.1109/ISOCC.2016.7799757. (Year: 2016).*
Weibin Sun and Robert Ricci. 2013. Fast and flexible: parallel packet processing with GPUs and click. In Proceedings of the ninth ACM/IEEE symposium on Architectures for networking and communications systems (ANCS '13). IEEE Press, 25-36. (Year: 2013).*
Kim, K. et al., "HMB-SSD: Framework for Efficient Exploiting of the Host Memory Buffer in the NVMe SSD", Oct. 14, 2019, https://ieeexplore.ieee.org/stamp/stamp.jsp?arnumber=8868151.
International Search Report and Written Opinion, PCT Application No. PCT/US2022/016202, dated May 23, 2022.

* cited by examiner

SYSTEMS AND METHODS FOR FRAGMENTATION MANAGEMENT IN HOST BUFFERS

FIELD

The present disclosure relates to storage systems. More particularly, the present disclosure relates to increase overall storage device performance by minimizing performance penalties when utilizing host-based buffers suffering from data fragmentation.

BACKGROUND

Storage devices are ubiquitous within computing systems. Solid-state storage devices ("SSDs") have become increasingly common. These nonvolatile storage devices can communicate and utilize various protocols including non-volatile memory express (NVMe), and peripheral component interconnect express (PCIe) to reduce processing overhead and increase efficiency.

Storage devices communicate with a plurality of host-computing devices. The host-computing devices can offer one or more host. memory buffers for use by the storage devices. For example, the NVMe version 1.2 specification introduced an host buffer option for SSDs. The Host Memory Buffer ("HMB") feature takes advantage of the direct memory access capabilities of PCI Express to allow SSDs to use some of the DRAM attached to the CPU, instead of requiring the SSD to bring its own DRAM. Accessing host memory over PCIe is often slower than accessing onboard DRAM, but can still be much faster than reading from flash.

However, as host buffers become more increasingly utilized, standard memory management problems may arise. One of these problems that can occur is fragmentation. In certain configurations, storage devices are required to deliver a certain amount of performance, which may be hindered by the increased time needed to access fragmented data within a host buffer. The increasingly higher standards and speeds of storage devices will be affected by these limitations.

BRIEF DESCRIPTION OF DRAWINGS

The above, and other, aspects, features, and advantages of several embodiments of the present disclosure will be more apparent from the following description as presented in conjunction with the following several figures of the drawings.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the problems described above, devices and methods are discussed herein attempt to increase the performance of a storage device by performing one or more fragmentation management processes to a host buffer system. In many embodiments, this may include defragmenting the host buffer. Often, the host buffer fragmentation management process will prioritize what data is defragmented first, or even set a boundary as to what data should be defragmented at all. As those skilled in the art will recognize, data accessed within a buffer can vary greatly in how often it is accessed or what speed the system expects to deliver the read data. In this way, various embodiments analyze the usage patterns of data within the host buffer to determine which control pages stored within them should be prioritized for defragmentation.

The host buffer fragmentation management process can attempt to identify high priority control pages and find a corresponding section of allocated host buffer data that is continuous (i.e., not fragmented) and swap the data stored within the continuous portion for the high priority control page data within the non-continuous portions. The process of swapping can often be accomplished during down times or during periods where the communication channels are not fully utilized.

In some embodiments, the host buffer may not contain a sufficiently continuous portion of allocated memory to swap all of the determined high priority control page data. However, in these instances, the host buffer fragmentation management process can send a dummy request to the host buffer which is configured to create a sufficiently continuous portion of memory that the high priority data can be moved into. This process may also be undertaken during periods of decreased operations.

Finally, in certain embodiments, there may not be either a sufficiently continuous portion of allocated memory or enough unallocated memory to even create the sufficiently continuous portion. In these cases, the host buffer fragmentation management process can instead cache mapping data that is relevant to the high priority control pages from the host buffer to the SSD internally.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C #, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Figure 1:
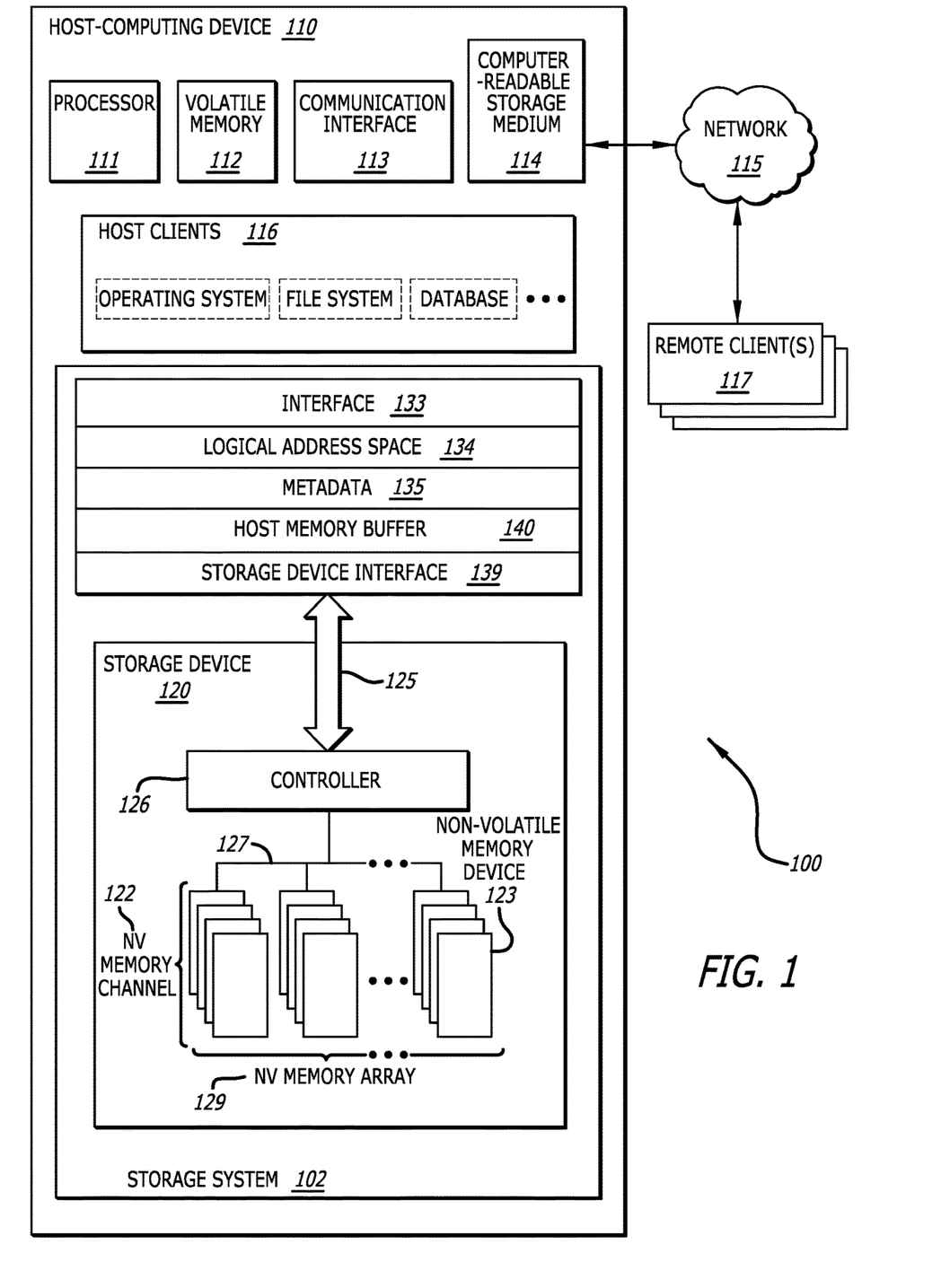
FIG. 1 is a schematic block diagram of a host-computing device with a storage device suitable for host buffer fragmentation management in accordance with an embodiment of the disclosure.

Referring to FIG. 1, a schematic block diagram of a host-computing device with a storage device suitable for host buffer fragmentation management in accordance with an embodiment of the disclosure is shown. The control block management system 100 comprises one or more storage devices 120 of a storage system 102 within a host-computing device 110 in communication via a controller 126. The host-computing device 110 may include a processor 111, volatile memory 112, and a communication interface 113. The processor 111 may include one or more central processing units, one or more general-purpose processors, one or more application-specific processors, one or more virtual processors (e.g., the host-computing device 110 may be a virtual machine operating within a host), one or more processor cores, or the like. The communication interface 113 may include one or more network interfaces configured to communicatively couple the host-computing device 110 and/or controller 126 of the storage device 120 to a communication network 115, such as an Internet Protocol (IP) network, a Storage Area Network (SAN), wireless network, wired network, or the like.

The storage device 120, in various embodiments, may be disposed in one or more different locations relative to the host-computing device 110. In one embodiment, the storage device 120 comprises one or more non-volatile memory devices 123, such as semiconductor chips or packages or other integrated circuit devices disposed on one or more printed circuit boards, storage housings, and/or other mechanical and/or electrical support structures. For example, the storage device 120 may comprise one or more direct inline memory module (DIMM) cards, one or more expansion cards and/or daughter cards, a solid-state-drive (SSD) or other hard drive device, and/or may have another memory and/or storage form factor. The storage device 120 may be integrated with and/or mounted on a motherboard of the host-computing device 110, installed in a port and/or slot of the host-computing device 110, installed on a different host-computing device 110 and/or a dedicated storage appliance on the network 115, in communication with the host-computing device 110 over an external bus (e.g., an external hard drive), or the like.

The storage device 120, in one embodiment, may be disposed on a memory bus of a processor 111 (e.g., on the same memory bus as the volatile memory 112, on a different memory bus from the volatile memory 112, in place of the volatile memory 112, or the like). In a further embodiment, the storage device 120 may be disposed on a peripheral bus of the host-computing device 110, such as a peripheral component interconnect express (PCI Express or PCIe) bus such, as but not limited to a NVM Express (NVMe) interface, a serial Advanced Technology Attachment (SATA) bus, a parallel Advanced Technology Attachment (PATA) bus, a small computer system interface (SCSI) bus, a FireWire bus, a Fibre Channel connection, a Universal Serial Bus (USB), a PCIe Advanced Switching (PCIe-AS) bus, or the like. In another embodiment, the storage device 120 may be disposed on a communication network 115, such as an Ethernet network, an Infiniband network, SCSI RDMA over a network 115, a storage area network (SAN), a local area network (LAN), a wide area network (WAN) such as the Internet, another wired and/or wireless network 115, or the like.

The host-computing device 110 may further comprise computer-readable storage medium 114. The computer-readable storage medium 114 may comprise executable instructions configured to cause the host-computing device 110 (e.g., processor 111) to perform steps of one or more of the methods disclosed herein. Additionally, or in the alternative, a buffering component may be embodied as one or more computer-readable instructions stored on the computer-readable storage medium 114.

A device driver and/or the controller 126, in certain embodiments, may present a logical address space 134 to the host clients 116. As used herein, a logical address space 134 refers to a logical representation of memory resources. The logical address space 134 may comprise a plurality (e.g., range) of logical addresses. As used herein, a logical address refers to any identifier for referencing a memory resource (e.g., data), including, but not limited to: a logical block address (LBA), cylinder/head/sector (CHS) address, a file name, an object identifier, an inode, a Universally Unique Identifier (UUID), a Globally Unique Identifier (GUID), a hash code, a signature, an index entry, a range, an extent, or the like.

A device driver for the storage device 120 may maintain metadata 135, such as a logical to physical address mapping structure, to map logical addresses of the logical address space 134 to media storage locations on the storage device(s) 120. A device driver may be configured to provide storage services to one or more host clients 116. The host clients 116 may include local clients operating on the host-computing device 110 and/or remote clients 117 accessible via the network 115 and/or communication interface 113. The host clients 116 may include, but are not limited to: operating systems, file systems, database applications, server applications, kernel-level processes, user-level processes, applications, and the like.

In many embodiments, the host-computing device 110 can include a plurality of virtual machines which may be instantiated or otherwise created based on user-request. As will be understood by those skilled in the art, a host-computing device 110 may create a plurality of virtual machines configured as virtual hosts which is limited only on the available computing resources and/or demand. A hypervisor can be available to create, run, and otherwise manage the plurality of virtual machines. Each virtual machine may include a plurality of virtual host clients similar to host clients 116 that may utilize the storage system 102 to store and access data.

The device driver may be further communicatively coupled to one or more storage systems 102 which may include different types and configurations of storage devices 120 including, but not limited to: solid-state storage devices, semiconductor storage devices, SAN storage resources, or the like. The one or more storage devices 120 may comprise one or more respective controllers 126 and non-volatile memory channels 122. The device driver may provide access to the one or more storage devices 120 via any compatible protocols or interface 133 such as, but not limited to, SATA and PCIe. The metadata 135 may be used to manage and/or track data operations performed through the protocols or interfaces 133. The logical address space 134 may comprise a plurality of logical addresses, each corresponding to respective media locations of the one or more storage devices 120. The device driver may maintain metadata 135 comprising any-to-any mappings between logical addresses and media locations.

A device driver may further comprise and/or be in communication with a storage device interface 139 configured to transfer data, commands, and/or queries to the one or more storage devices 120 over a bus 125, which may include, but is not limited to: a memory bus of a processor 111, a peripheral component interconnect express (PCI Express or PCIe) bus, a serial Advanced Technology Attachment (ATA) bus, a parallel ATA bus, a small computer system interface (SCSI), FireWire, Fibre Channel, a Universal Serial Bus (USB), a PCIe Advanced Switching (PCIe-AS) bus, a network 115, Infiniband, SCSI RDMA, or the like. The storage device interface 139 may communicate with the one or more storage devices 120 using input-output control (IO-CTL) command(s), IO-CTL command extension(s), remote direct memory access, or the like.

The storage system 102 may further include a secure host memory buffer 140. The secure host memory buffer 140 may be configured to receive and store data from a storage device 120. In this way, the secure host memory buffer 140 can be configured as an external memory storage for the storage device 120 which can be utilized in the event the storage device encounters a fatal/critical error and becomes nonresponsive. In certain embodiments, the secure host memory buffer 140 may be configured as a regular, non-secure memory buffer. In still further embodiments, the secure host memory buffer 140 may be stored outside of the storage system 102 and may be located within a different part of the host-computing device 110. In still yet further embodiments, the secure host memory buffer 140 may be located remotely as part of one or more remote clients 117.

The communication interface 113 may comprise one or more network interfaces configured to communicatively couple the host-computing device 110 and/or the controller 126 to a network 115 and/or to one or more remote clients 117 (which can act as another host). The controller 126 is part of and/or in communication with one or more storage devices 120. Although FIG. 1 depicts a single storage device 120, the disclosure is not limited in this regard and could be adapted to incorporate any number of storage devices 120.

The storage device 120 may comprise one or more non-volatile memory devices 123 of non-volatile memory channels 122, which may include but is not limited to: ReRAM, Memristor memory, programmable metallization cell memory, phase-change memory (PCM, PCME, PRAM, PCRAM, ovonic unified memory, chalcogenide RAM, or C-RAM), NAND flash memory (e.g., 2D NAND flash memory, 3D NAND flash memory), NOR flash memory, nano random access memory (nano RAM or NRAM), nanocrystal wire-based memory, silicon-oxide based sub-10 nanometer process memory, graphene memory, Silicon Oxide-Nitride-Oxide-Silicon (SONOS), programmable metallization cell (PMC), conductive-bridging RAM (CBRAM), magneto-resistive RAM (MRAM), magnetic storage media (e.g., hard disk, tape), optical storage media, or the like. The one or more non-volatile memory devices 123 of the non-volatile memory channels 122, in certain embodiments, comprise storage class memory (SCM) (e.g., write in place memory, or the like).

While the non-volatile memory channels 122 is referred to herein as "memory media," in various embodiments, the non-volatile memory channels 122 may more generally comprise one or more non-volatile recording media capable of recording data, which may be referred to as a non-volatile memory medium, a non-volatile memory device, or the like. Further, the storage device 120, in various embodiments, may comprise a non-volatile recording device, a non-volatile memory array 129, a plurality of interconnected storage devices in an array, or the like.

The non-volatile memory channels 122 may comprise one or more non-volatile memory devices 123, which may include, but are not limited to: chips, packages, planes, die, or the like. A controller 126 may be configured to manage data operations on the non-volatile memory channels 122, and may comprise one or more processors, programmable processors (e.g., FPGAs), ASICs, micro-controllers, or the like. In some embodiments, the controller 126 is configured to store data on and/or read data from the non-volatile memory channels 122, to transfer data to/from the storage device 120, and so on.

The controller 126 may be communicatively coupled to the non-volatile memory channels 122 by way of a bus 127. The bus 127 may comprise an I/O bus for communicating data to/from the non-volatile memory devices 123. The bus 127 may further comprise a control bus for communicating addressing and other command and control information to the non-volatile memory devices 123. In some embodiments, the bus 127 may communicatively couple the non-volatile memory devices 123 to the controller 126 in parallel. This parallel access may allow the non-volatile memory devices 123 to be managed as a group, forming a non-volatile memory array 129. The non-volatile memory devices 123 may be partitioned into respective logical memory units (e.g., logical pages) and/or logical memory divisions (e.g., logical blocks). The logical memory units may be formed by logically combining physical memory units of each of the non-volatile memory devices 123.

The controller 126 may organize a block of word lines within a non-volatile memory device 123, in certain embodiments, using addresses of the word lines, such that the word lines are logically organized into a monotonically increasing sequence (e.g., decoding and/or translating addresses for word lines into a monotonically increasing sequence, or the like). In a further embodiment, word lines of a block within a non-volatile memory device 123 may be physically arranged in a monotonically increasing sequence of word line addresses, with consecutively addressed word lines also being physically adjacent (e.g., WL0, WL1, WL2, . . . . WLN).

The controller 126 may comprise and/or be in communication with a device driver executing on the host-computing device 110. A device driver may provide storage services to the host clients 116 via one or more interfaces 133. A device driver may further comprise a storage device interface 139 that is configured to transfer data, commands, and/or queries to the controller 126 over a bus 125, as described above.

Figure 2:
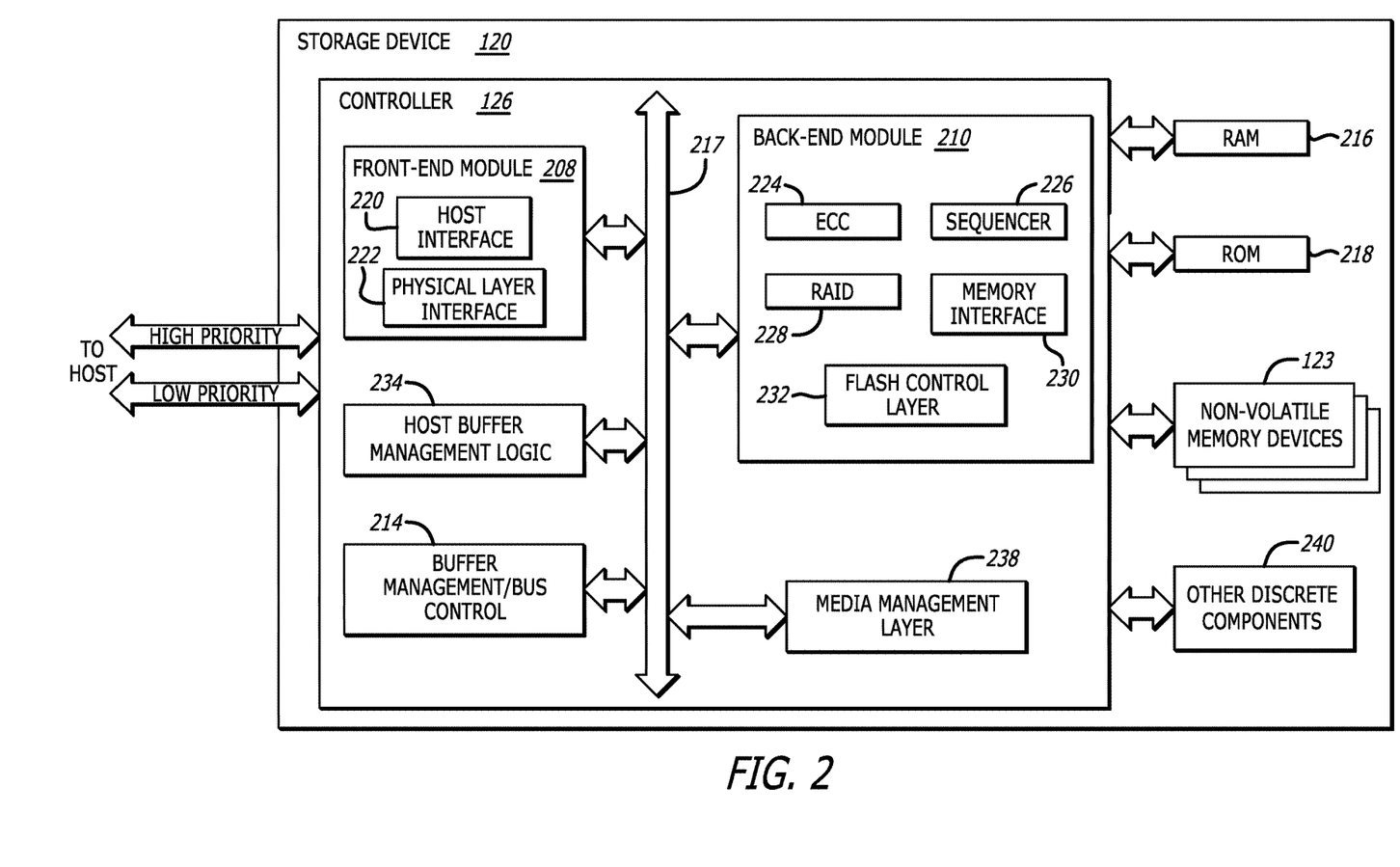
FIG. 2 is a schematic block diagram of a storage device suitable for host buffer fragmentation management in accordance with an embodiment of the disclosure.

Referring to FIG. 2, a schematic block diagram of a storage device suitable for host buffer fragmentation management in accordance with an embodiment of the disclosure is shown. The controller 126 may include a front-end module 208 that interfaces with a host via a plurality of high priority and low priority communication channels, a back-end module 210 that interfaces with the non-volatile memory devices 123, and various other modules that perform various functions of the storage device 120. In some examples, each module may just be the portion of the memory that comprises instructions executable with the processor to implement the features of the corresponding module without the module including any other hardware. Because each module includes at least some hardware even when the included hardware comprises software, each module may be interchangeably referred to as a hardware module.

The controller 126 may include a buffer management/bus control module 214 that manages buffers in random access memory (RAM) 216 and controls the internal bus arbitration for communication on an internal communications bus 217 of the controller 126. A read only memory (ROM) 218 may store and/or access system boot code. Although illustrated in FIG. 2 as located separately from the controller 126, in other embodiments one or both of the RAM 216 and the ROM 218 may be located within the controller 126. In yet other embodiments, portions of RAM 216 and ROM 218 may be located both within the controller 126 and/or outside the controller 126. Further, in some implementations, the controller 126, the RAM 216, and the ROM 218 may be located on separate semiconductor dies. As discussed below, in one implementation, the submission queues and the completion queues may be stored in a controller memory buffer, which may be housed in RAM 216.

Additionally, the front-end module 208 may include a host interface 220 and a physical layer interface 222 that provides the electrical interface with the host or next level storage controller. The choice of the type of the host interface 220 can depend on the type of memory being used. Examples types of the host interfaces 220 may include, but are not limited to, SATA, SATA Express, SAS, Fibre Channel, USB, PCIe, eMMC, UFS, and/or NVMe. The host interface 220 may typically facilitate transfer for data, control signals, and timing signals.

The back-end module 210 may include an error correction controller (ECC) engine 224 that encodes the data bytes received from the host and decodes and error corrects the data bytes read from the non-volatile memory devices 123. The back-end module 210 may also include a command sequencer 226 that generates command sequences, such as program, read, and erase command sequences, to be transmitted to the non-volatile memory devices 123. Additionally, the back-end module 210 may include a RAID (Redundant Array of Independent Drives) module 228 that manages generation of RAID parity and recovery of failed data. The RAID parity may be used as an additional level of integrity protection for the data being written into the storage device 120. In some cases, the RAID module 228 may be a part of the ECC engine 224. A memory interface 230 provides the command sequences to the non-volatile memory devices 123 and receives status information from the non-volatile memory devices 123. Along with the command sequences and status information, data to be programmed into and read from the non-volatile memory devices 123 may be communicated through the memory interface 230. A flash control layer 232 may control the overall operation of back-end module 210.

Additional modules of the storage device 120 illustrated in FIG. 2 may include a media management layer 238, which performs wear leveling of memory cells of the non-volatile memory devices 123. The storage device 120 may also include other discrete components 240, such as external electrical interfaces, external RAM, resistors, capacitors, or other components that may interface with controller 126. In alternative embodiments, one or more of the RAID modules 228, media management layer 238 and buffer management/bus control module 214 are optional components that may not be necessary in the controller 126.

Finally, the controller 126 may also comprise a host buffer management logic 234. In many embodiments, the host buffer management logic 234 can be configured to facilitate one or more fragmentation management operations between the storage device 120 and the host-computing device 110. For example, the host buffer management logic 234 can establish one or more communication channels between the host buffer and the storage device. The transfer of data back and forth between the storage device 120 and the host buffer may also be facilitated by the host buffer management logic 234.

The host buffer management logic 234 can determine and implement the type of host buffer operation and relationship. In some embodiments, the host buffer system utilized can be a host memory buffer ("HMB") system as outlined within the NVMe specification. In further embodiments, the host buffer management logic 234 can analyze the host buffer usage for determining when buffer data such as control pages should be targeted for defragmentation. For example, the latency of a certain set of control pages may be desired to be as low as possible or at least below a predetermined threshold. The host buffer management logic 234 may monitor these latencies and implement or select host buffer data to process through one or more defragmentation operations.

Figure 3:
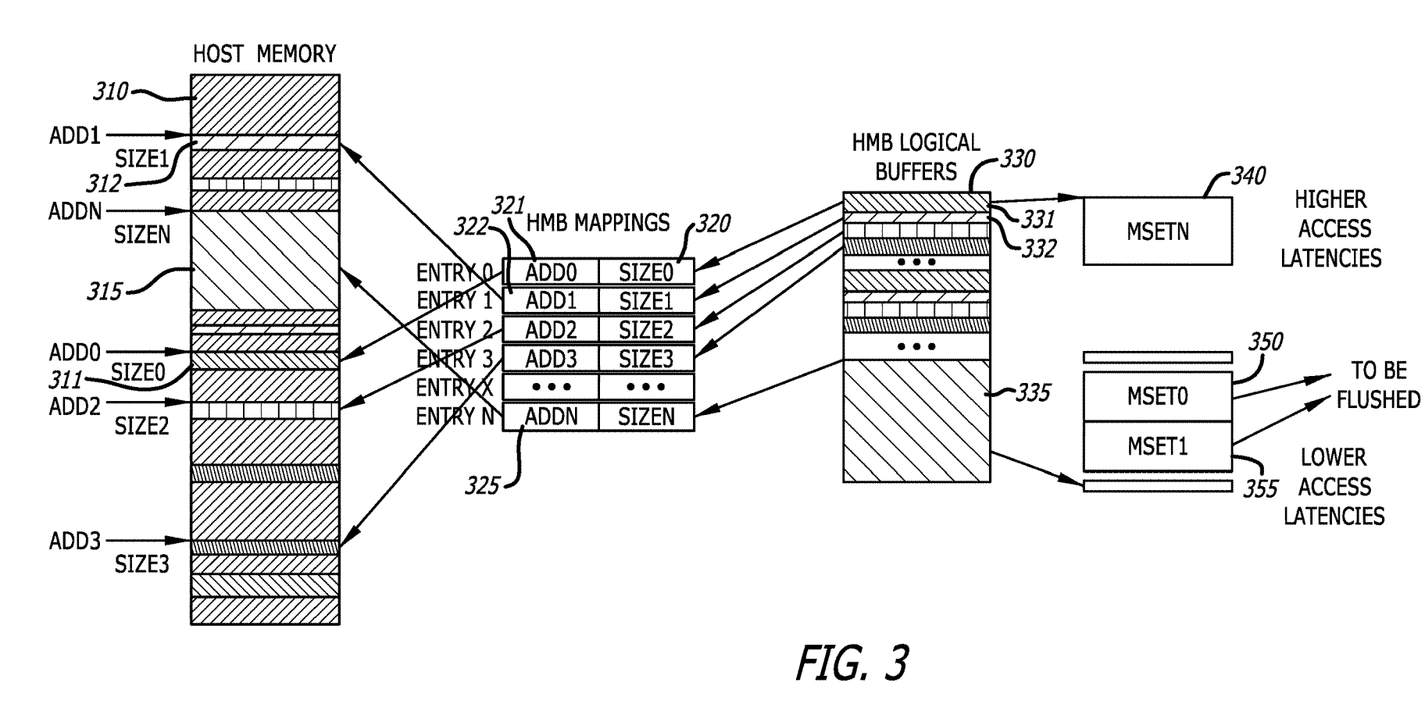
FIG. 3 is a conceptual illustration depicting a host buffer transfer system in accordance with an embodiment of the disclosure.

Referring to FIG. 3, a conceptual illustration depicting a host buffer transfer system in accordance with an embodiment of the disclosure is shown. A host memory 310 becomes available to a storage device, usually in the form of a host buffer. The data stored within the host memory 310 can be logically ordered within a host logical buffer 330 which may be an actual buffer or a representation of the data in an ordered fashion. A plurality of mappings 320 as mapping data can be utilized to map the host logical buffer 330 to the actual host memory 310.

In a number of embodiments, the mappings 320 may include a series of control page address and an associated size. For example, entry 0 321 in mappings 320 has an address location 0 and a size associated with it (size 0). Entry 0 321 maps a first logical buffer location 331 comprising one or more control pages to a third host memory location 311. It can be seen that the first logical buffer location 331 does not correspond to the same location of the actual host buffer, necessitating the need for a mapping entry 0 321.

Likewise, a second logical buffer location 332 can be mapped as entry 1 322 to a first host memory location 312. Those skilled in the art will recognize that the logical location of the buffer data does not have to directly correspond to the location within the actual host memory 310. The sizes of the buffer data may also vary greatly depending on the type of buffer data utilized. In most embodiments, the buffer data will comprise control page data. Indeed, various embodiments will group control page data into a series or set of control pages that are associated with one another. These control page sets may account for differences in data size.

During operations, it may be determined that various sets of control pages are determined to be of high enough priority or are utilized enough that they should be stored within the host buffer in a defragmented state. The storage device can organize these high priority control page sets 350, 355 into one or more sets which can be assigned to a continuous logical buffer 335. The embodiment depicted in FIG. 3 shows two sets of control pages 350, 355 (labelled as MSET0 and MSET1 respectively) arranged to be stored within a logical buffer 335. This logical buffer 335 is labelled as Entry N 325 within the plurality of mappings 320 which associates it to a second host memory location 315. Other normal or low priority control page sets, such as the MSETN 340 control page set, may be assigned to one or more non-continuous locations within the host memory 310.

Ideally, the host memory would be able to accommodate any new buffer data requests and generate a continuous memory location. However, as the host memory 310 is depleted, it may be the case that the available memory is insufficient to create the needed continuous memory locations. In response to this, one or more fragmentation management operations may be performed that can better optimize the storage device performance by minimizing the negative effects on one or more host buffer data due to fragmentation. Methods of managing fragmentation within host buffers are described in more detail below.

Figure 4:
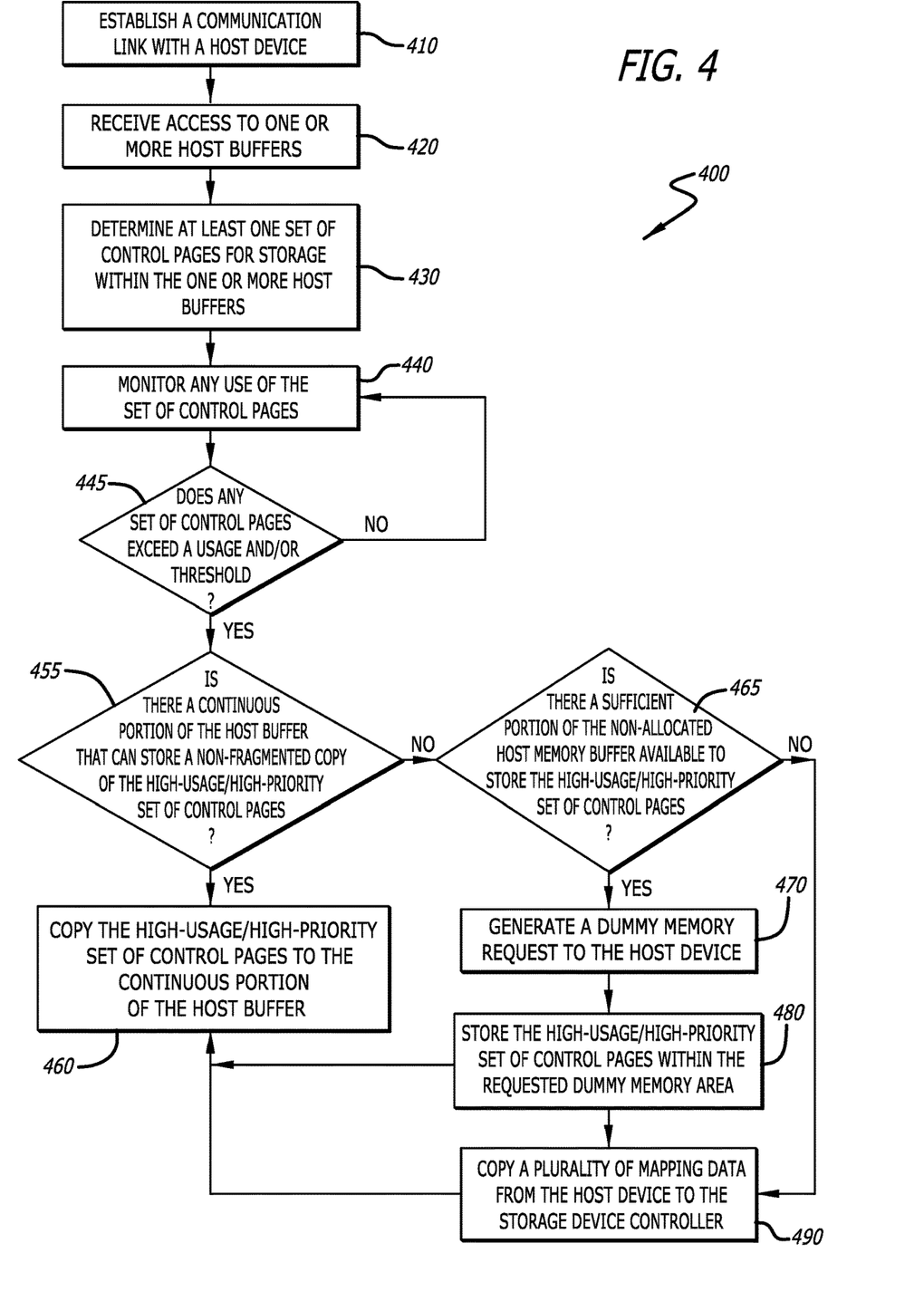
FIG. 4 is a flowchart depicting a process compensating for fragmentation within a host buffer in accordance with an embodiment of the disclosure.

Referring to FIG. 4, a flowchart depicting a process 400 compensating for fragmentation within a host buffer in accordance with an embodiment of the disclosure is shown. In many embodiments, the process 400 can first begin upon establishing a communication link with a host device (block 410). Often, this is a standard input/output connection between the host device and the storage device. Once established, the storage device can then receive access to one or more host buffers (block 420). Often, the host buffers are provided as part of a HMB protocol utilized within the NVMe specification, although this is not required.

During operation at least one set of control pages will be generated (block 430). This control page data is typically associated with operations needed to read and/or translate data stored within the storage device memory array with logical mappings of data sent and requested by the host computing device. Over time, these control pages will be stored, utilized, and/or updated during normal operations. In a number of embodiments, the process 400 will monitor any use of the set of control pages (block 440).

Based on the type of performance level desired, or of a specific application, the process 400 can generate or receive a threshold value that indicates whether a control page has sufficient priority such that defragmentation management is necessary. In certain embodiments, the frequency of usage and/or access of the control pages can be utilized to assign a priority. The process 400 can determine if any set of control pages exceeds this usage level or threshold limit (block 445). If no control pages are determined to be of a sufficient or high priority, then the process 400 can continue to monitor the control page usage (block 440).

Upon determination that there exists at least one set or plurality of control pages that should be defragmented (if not already), the process 400 can begin further host buffer fragmentation management. In various embodiments, this can begin by determining if there is a continuous portion of the host buffer that can store a non-fragmented copy of the exceeded usage set of control pages (block 455). In some embodiments, the control pages may be marked as high priority and may not be associated with previous direct usage sufficient to initially qualify to fragmentation management.

When there is a sufficiently continuous portion of the host buffer, the process 400 can copy the exceeded usage set of control pages to the continuous portion of the host buffer (block 460). As described in more detail in FIG. 5, this copying can be done as a swap with the data previously stored in the continuous portion which can occur during operational down time within the storage device and/or host-computing device. However, if there is not a currently allocated sufficiently continuous portion of host buffer memory available, or once the copying is complete, the process 400 can determine if there is a sufficiently continuous portion of unallocated memory within the host buffer (block 465).

In situations where there is a sufficient continuous portion of unallocated memory within the host buffer, the process 400 can generate a dummy memory request to the host device (block 470). This request can be configured to have the effect of directing the host-computing device to allocate a portion of continuous memory for storing a plurality of high priority control pages. Once allocated, the control pages with a determined exceeded usage (or assigned priority) to the dummy memory area that was just allocated (block 480).

However, upon determination that there is not a sufficient portion of unallocated memory suitable for storing the high usage or high priority control pages, the process may then attempt another method of fragmentation management. In various embodiments, a plurality of mapping data can be copied from the host-computing device to the storage device (block 490). In certain embodiments, the copying may be more specifically from a host-computing device buffer to a storage device controller. More details on each of these fragmentation management methods is described in more detail below in FIGS. 5-7.

Figure 5:
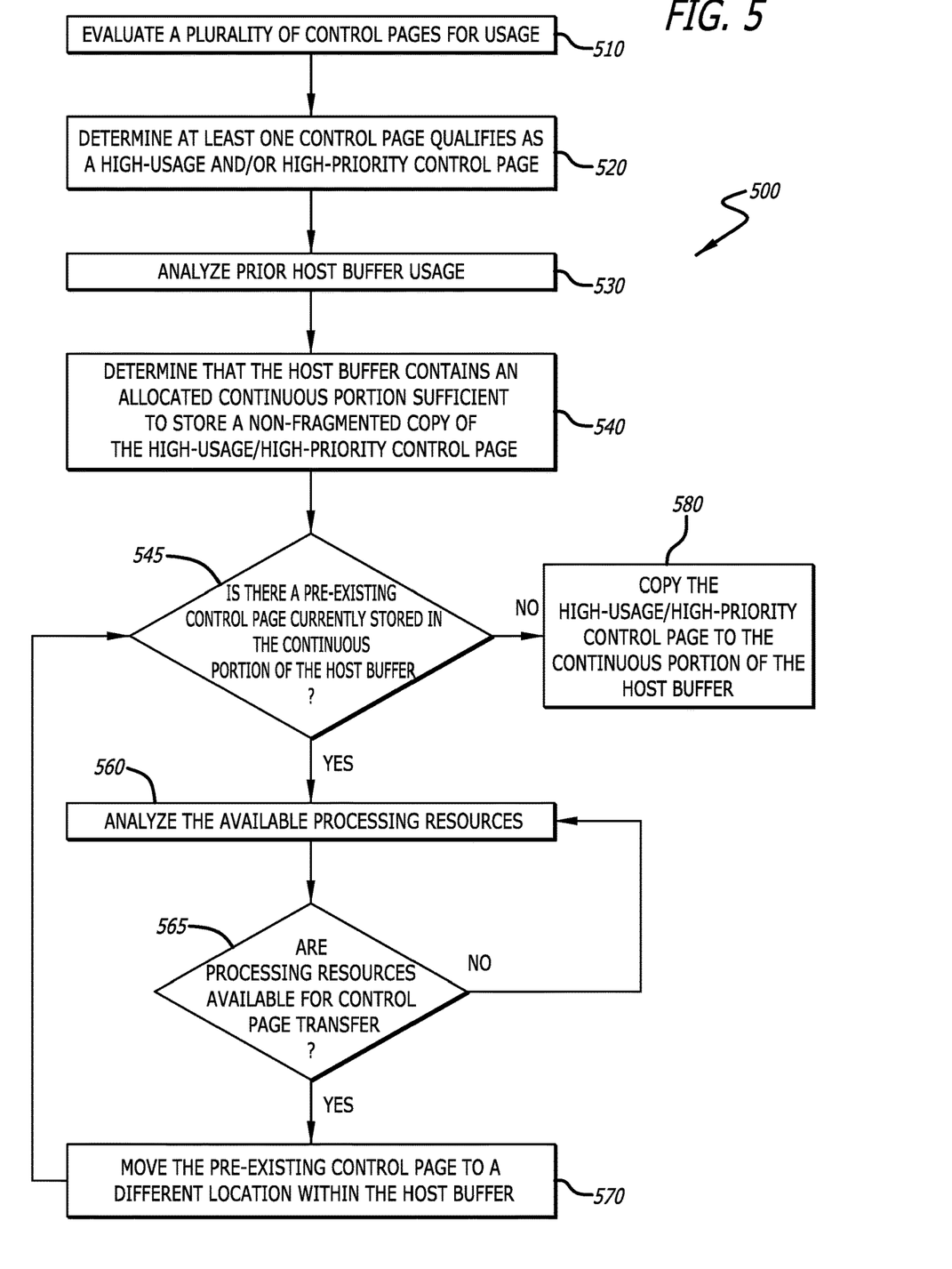
FIG. 5 is a flowchart depicting a process for swapping host buffer data in accordance with an embodiment of the disclosure.

Referring to FIG. 5, a flowchart depicting a process 500 for swapping host buffer data in accordance with an embodiment of the disclosure is shown. In many embodiments, the process 500 can begin by evaluating a plurality of control pages for usage (block 510). In additional embodiments, the evaluation may be determining an overall or assigned priority of the control pages which can be based on various factors including, but not limited to, their desired performance characteristics.

In a number of embodiments, the evaluation will determine that at least one control page qualifies as a high usage (or high priority) control page (block 520). In various embodiments, this designation of control pages can be noted via a priority indicator that is assigned, or otherwise associated to the control pages. A priority indicator can be utilized as a demarcation tool when processing various control page data.

Once a plurality of control pages have been selected for fragmentation management processing, an analysis of the prior host buffer usage can be done (block 530). This analysis can be done in order to generate an internal mapping of the current state of the host buffer. In these embodiments, by noting various data sent to and received from the host-computing device, the number of continuous portions residing within the host buffer can be understood. In certain embodiments, the storage device may be able to poll, or directly interact with the host-computing device such that a mapping of the current state of the host buffer can be recognized by the storage device. In further embodiments, the mapping data associated with the host buffer can be analyzed to determine the current state of the host buffer. However, analyzing the previous host buffer usage requires no interactions between the host-computing device and the storage device.

Upon analyzing the prior host buffer usage, or polling the host-computing device, the process 500 can determine if a continuous (i.e., non-fragmented) portion of the host buffer memory exists that can store the high-usage/high-priority control pages (block 540). If no such memory exists, other methods of host buffer fragmentation management can be tried. However, if such a portion of memory is determined to currently exist, the process 500 can determine if one or more control pages that currently reside within the portion that are not assigned a priority identifier that indicates they should remain there (block 545).

If no pages are currently within the continuous portion of host buffer memory, then the process 500 can copy the high-usage/high-priority control pages to the continuous portion (block 580). However, it is often the case that at least one control page resides within the continuous portion that should be swapped out. Here, the process 500 can initiate a swapping process that moves low-usage/low-priority control pages out of the continuous portion and moves high-usage/high-priority control pages in. Though, coordinating and executing these moves requires processing resources which may not always be available depending on the state of the current usage of either the storage device and/or the host-computing device.

The process 500 can analyze the available processing resources needed for swapping control pages (block 560). In a number of embodiments, the available processing resources will increase during downtimes or other suboptimal usage. In additional embodiments, the processing resources can be the amount of throughput available within various communication channels between the devices. Upon a fixed or dynamic amount of time passing, the process 500 can determine if any processing resources are available for transferring control pages at that moment (block 565). If no processing resources are available, then the process 500 can attempt to analyze the processing resources again, typically at a later time or upon one or more conditions changing.

When sufficient additional processing resources are available for control page transfer, the process 500 can begin moving the pre-existing control page from the continuous portion of host buffer memory to a different location within the host buffer (block 570). This may include requesting a new partition or portion of the host buffer to be allocated, although it is not required. Then, at least one control page can be moved to the continuous portion of the host buffer memory to take the place of the transferred control page. It is contemplated that control pages may sometimes vary in size and as such, moving one control page out of the continuous portion may allow for the transfer in of more than one control page of the high-usage/high-priority plurality of control pages. This process of swapping in and out of control pages within the continuous portion may repeat until all pre-existing control pages are removed such that only the high-usage/high-priority control pages remain within the continuous portion.

Figure 6:
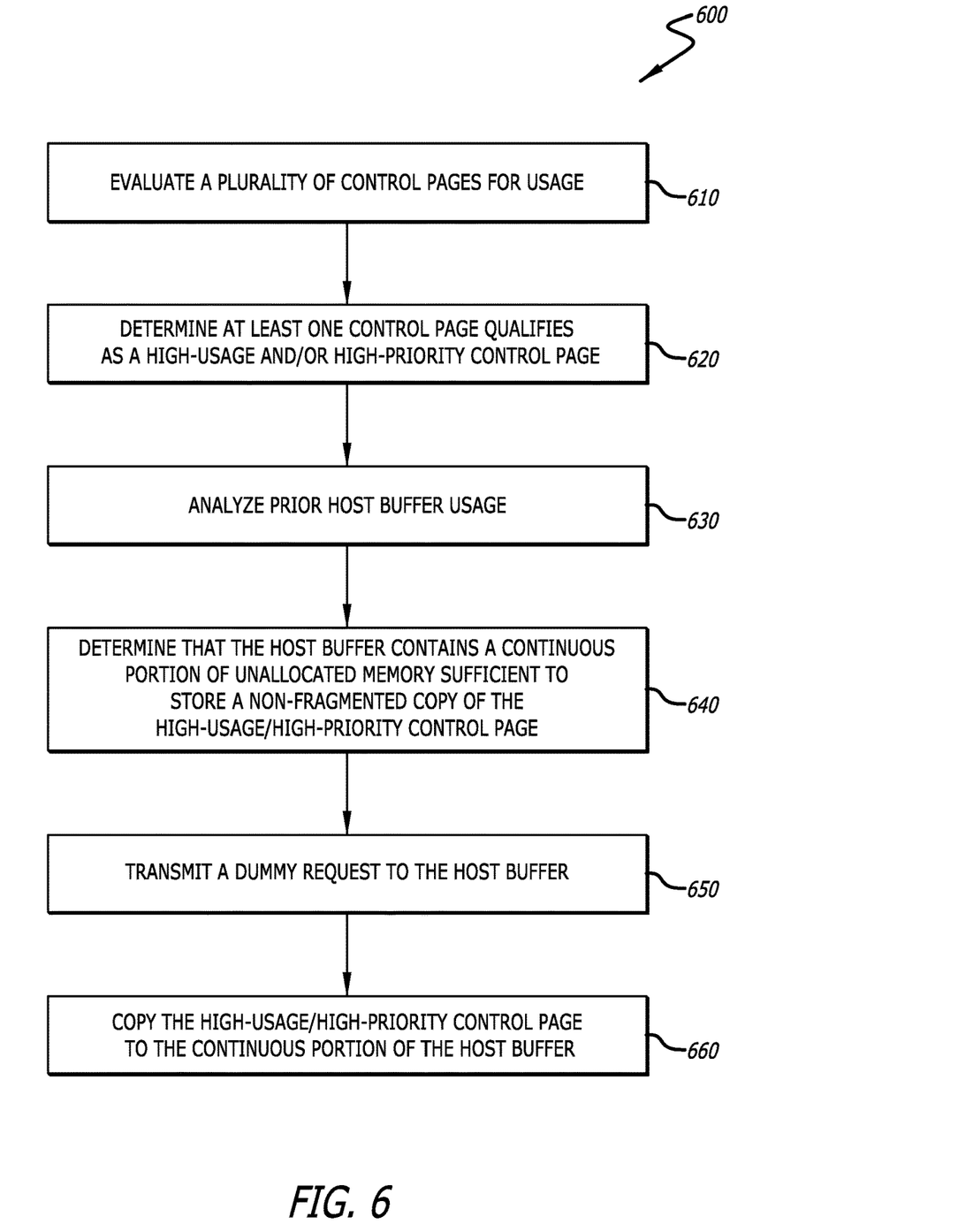
FIG. 6 is a flowchart depicting a process for creating defragmented host buffer data in accordance with an embodiment of the disclosure.

Referring to FIG. 6, a flowchart depicting a process 600 for creating defragmented host buffer data in accordance with an embodiment of the disclosure is shown. Similar to the previous host buffer fragmentation management process 500, the process 600 can begin by evaluating a plurality of control pages for usage (block 610). Again, in additional embodiments, the evaluation may be determining an overall or assigned priority of the control pages which can be based on various factors including, but not limited to, their desired performance characteristics.

In a variety of embodiments, the evaluation will determine that at least one control page qualifies as a high usage (or high priority) control page (block 620). In various embodiments, this designation of control pages can be noted via a priority indicator that is assigned, or otherwise associated to the control pages. A priority indicator can be utilized as a demarcation tool when processing various control page data.

Once a plurality of control pages have been selected for fragmentation management processing, an analysis of the prior host buffer usage can be done (block 630). This analysis can be done in order to generate an internal mapping of the current state of the host buffer. In these embodiments, by noting various data sent to and received from the host-computing device, the amount of continuous portions residing within the host buffer can be understood. In certain embodiments, the storage device may be able to poll, or directly interact with the host-computing device such that a mapping of the current state of the host buffer can be recognized by the storage device. However, analyzing the previous host buffer usage requires no interactions between the host-computing device and the storage device.

Figure 7:
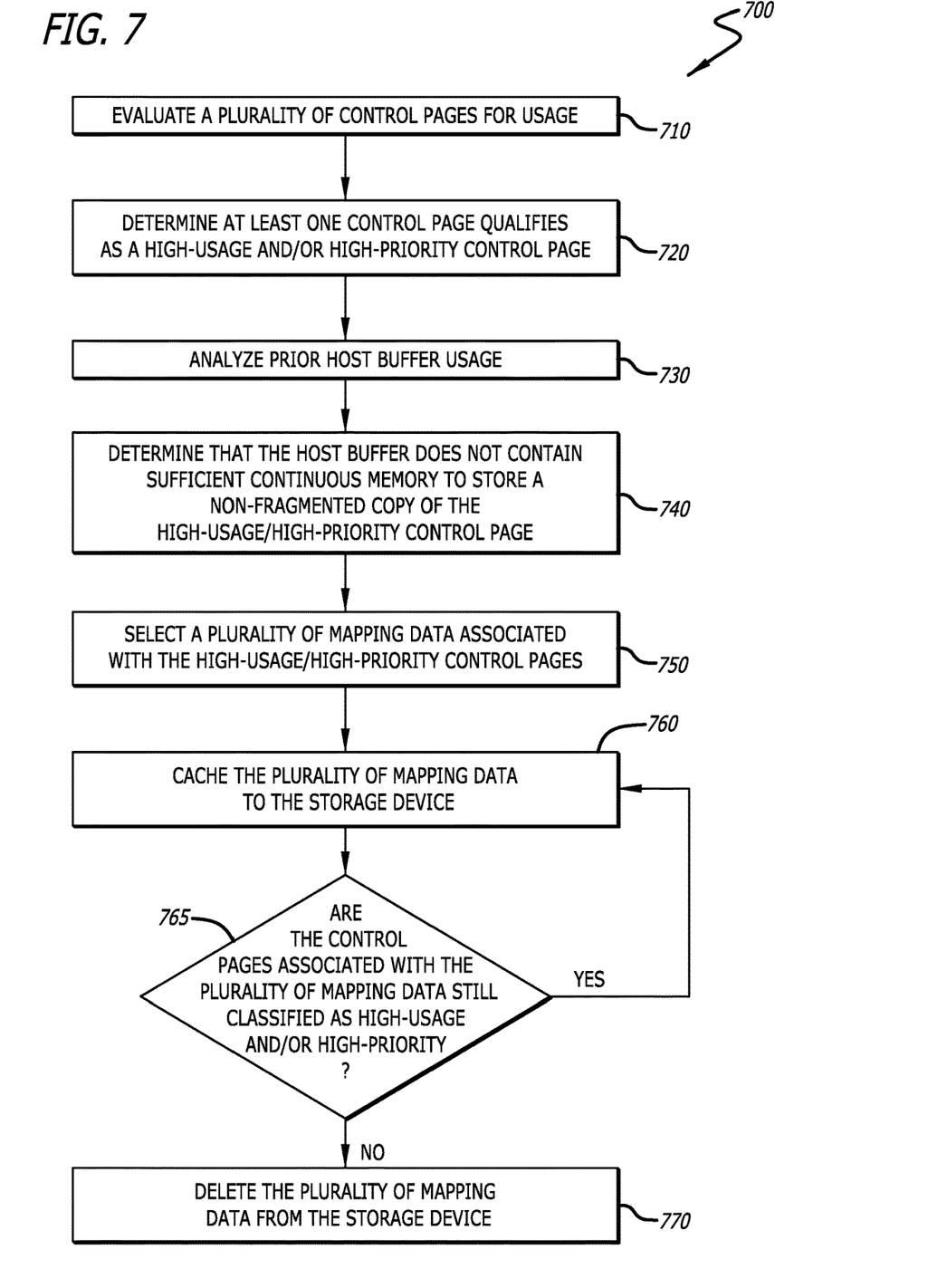
FIG. 7 is a flowchart depicting a process for caching host buffer mappings within a storage device in accordance with an embodiment of the disclosure.

The previous steps of process 600 can be carried out in many of the embodiments. However, in certain embodiments, the previous steps may be omitted and the remaining steps within process 600 can be executed in response to another host buffer defragmentation management process occurring. For example, the remaining steps in process 600 can be executed in response to process 500 determining that there is not an allocated portion of continuous host buffer memory suitable for storing the high-usage/high-priority control pages. However, it is contemplated that process 600 can run on by its own without a dependency from another process 500, 700.

The process 600 can determine if the host buffer contains a continuous portion of unallocated memory sufficient to store a non-fragmented copy of the plurality of high-usage/high-priority control pages (block 640). In response to a positive determination that there is sufficient continuous non-allocated host buffer memory, the process 600 can transmit a dummy request to create an allocated continuous portion of memory (block 650). In some embodiments, the dummy request is made to the host buffer. In other embodiments, the dummy request is made to the host-computing device.

Once transmitted, the dummy request can direct the host-computing device to allocate a continuous portion of unallocated host buffer memory sufficient to store a non-fragmented copy of the plurality of high-usage/high-priority control pages. Once allocated, the process 600 can copy the high-usage/high-priority control page data to the continuous portion of the host buffer (block 660). However, in certain embodiments, there may still not be enough continuous non-allocated data within the host buffer to store a defragmented copy of the high-usage/high-priority control pages. An additional method of fragmentation described below within the discussion of FIG. 7 explains an additional method that may be utilized in these cases.

Referring to FIG. 7, a flowchart depicting a process 700 for caching host buffer mappings within a storage device in accordance with an embodiment of the disclosure is shown. Similar to the beginning of the processes 500, 600 described previously in the discussions of FIGS. 5 and 6, the process 700 can begin by evaluating a plurality of control pages for usage (block 710). Once again, in some embodiments, the evaluation may be determining an overall or assigned priority of the control pages which can be based on various factors including, but not limited to, their desired performance characteristics. This evaluation may in certain embodiments be facilitated by a host buffer management logic which can assign or associate a priority indicator to each of the control pages or sets of control pages. In more embodiments, the evaluation will determine that at least one control page qualifies as a high usage (or high priority) control page (block 720). A priority indicator can be utilized as a demarcation tool when processing various control page data.

Once a plurality of control pages have been selected for fragmentation management processing, an analysis of the prior host buffer usage can be done (block 730). This analysis can also be done to generate an internal mapping of the current state of the host buffer. In these embodiments noting various data sent to and received from the host-computing device can allow for the number of continuous portions residing within the host buffer to be known. In various embodiments, the storage device may be able to poll, or directly interact with the host-computing device such that a mapping of the current state of the host buffer can be recognized by the storage device. However, analyzing the previous host buffer usage requires no interactions between the host-computing device and the storage device.

Similar to the process 600 described above, the previous steps of this process 700 can be carried out in many of the embodiments. However, in certain embodiments, the previous steps may be omitted and the remaining steps within the process 700 can be executed in response to another host buffer defragmentation management process occurring. For example, the remaining steps in this process 700 can be executed in response to process 600 determining that there is not an unallocated portion of continuous host buffer memory suitable for storing the high-usage/high-priority control pages. However, it is also contemplated that process 700 can be executed on its own without a dependency from another process 500, 600.

The process 700 can determine when the host buffer does not contain sufficient continuous memory to store a non-fragmented copy of the high-usage/high-priority control pages (block 740). This determination can include evaluating available allocated and unallocated host buffer memory. As there is no memory available within the host buffer to defragment the necessary control pages, certain data may instead be cached within the storage device.

Specifically, many embodiments may select a plurality of mapping data associated with the high-usage/high-priority control pages (block 750). Often, the storage device does not have enough available storage space within the memory array or other memory locations to store the entire plurality of control pages. Therefore, caching the mapping data associated with the control pages may provide a benefit to storage device performance without defragmenting the high-usage/high-priority control pages.

Once selected, the plurality of mapping data can be cached to the storage device (block 760). As stated previously, these operations may occur during non-peak usage of the storage device, host-computing device, or the communication channels between the two. The process 700 can continue to monitor or poll the usage and/or priority of the control pages associated with the cached mapping data. Periodically, it may be determined if the associated control pages are still classified as high-usage and/or high-priority (block 765). When no change in a control page's priority indicator is found, no changes to operations occur until a subsequent evaluation is done at a specified later time. However, once the control pages associated with the cached mapping data are not considered high-usage and/or high-priority, the mapping data stored within the storage device can be deleted (block 770).

Information as herein shown and described in detail is fully capable of attaining the above-described object of the present disclosure, the presently preferred embodiment of the present disclosure, and is, thus, representative of the subject matter that is broadly contemplated by the present disclosure. The scope of the present disclosure fully encompasses other embodiments that might become obvious to those skilled in the art, and is to be limited, accordingly, by nothing other than the appended claims. Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, work-piece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device comprising:
    a processor;
    a memory array comprising a plurality of non-volatile memory devices; and
    a host buffer management logic configured to:
        establish a communication link with a host device;
        obtain access to one or more host buffers;
        utilize the one or more host buffers for processing a plurality of control pages of one or more of the plurality of non-volatile memory devices;

determine that one or more of the plurality of control pages require fragmentation management wherein the fragmentation management comprises one or more operations to minimize negative effects on the determined one or more of the plurality of control pages due to fragmentation;

analyze a state of the one or more host buffers; and perform at least one fragmentation management operation process on the one or more host buffers based on the state of the one or more host buffers, wherein the analysis comprises monitoring the usage of the one or more host buffers.

2. The device of claim 1, wherein the analysis comprises accessing mapping data associated with the one or more host buffers.

3. The device of claim 1, wherein the at least one fragmentation management operation includes:

searching a host buffer analysis for continuous portions of memory;

determining that at least one continuous portion of host buffer memory is sufficient to store one or more control pages requiring fragmentation management;

waiting until an available processing downtime occurs;

swapping, upon available processing downtime, any control page data stored within the continuous portions of host buffer memory with the one or more control pages requiring fragmentation management.

4. The device of claim 3, wherein the processing downtime occurs in response to decreased PCIe bandwidth usage.

5. The device of claim 3, wherein the processing downtime occurs in response to available processing cycles being made available.

6. The device of claim 1, wherein the at least one fragmentation management operation includes:

searching a host buffer analysis for continuous portions of memory;

determining that no continuous portions of the allocated host buffer memory is sufficient to store one or more control pages requiring fragmentation management;

sending a dummy request for a new portion of host buffer memory be allocated sufficient to store the one or more control pages requiring fragmentation management; and copying the one or more control pages requiring fragmentation management to the newly allocated host buffer.

7. The device of claim 1, wherein the at least one fragmentation management operation includes:

searching a host buffer analysis for continuous portions of memory;

determining that no continuous portions of the allocated host buffer memory is sufficient to store one or more control pages requiring fragmentation management;

determining that no continuous portions of the unallocated host buffer memory is sufficient to store one or more control pages requiring fragmentation management;

determining at least one set of data relevant to the one or more control pages requiring fragmentation management; and caching the determined set of data to the device.

8. The device of claim 7, wherein the determined set of data comprises mapping data associated with the one or more control pages requiring fragmentation management.

9. The device of claim 1, wherein the determination comprises exceeding one or more thresholds.

10. The device of claim 9, wherein the one or more thresholds comprise an overall usage of the plurality of control pages.

11. The device of claim 9, wherein the one or more thresholds comprise a priority level of the plurality of control pages.

12. The device of claim 11, wherein the priority level is assigned based on a desired performance level of the device.

13. The device of claim 12, wherein the desired performance level is a reduced latency within one or more operations of the device.

14. The device of claim 1, wherein the host buffer is a Host Memory Buffer (HMB) compatible with the NVMe specification.

15. A method of managing fragmentation within host buffers, comprising:

establishing a communication link between a storage device having a plurality of non-volatile memory devices and a host device;

providing the storage device access to one or more host device buffers;

utilizing the one or more host buffers for processing a plurality of control pages of one or more of the plurality of non-volatile memory devices;

determining that one or more of the plurality of control pages require fragmentation management wherein the fragmentation management comprises one or more operations to minimize negative effects on performance within the storage device due to fragmentation of one or more of the plurality of control pages;

analyzing a state of the one or more host buffers; and performing at least one fragmentation management operation process on the one or more host buffers based on the state of the one or more host buffers, wherein the analyzing comprises monitoring the usage of the one or more host buffers.

16. The method of claim 15, wherein the at least one fragmentation management operation may include:

searching a host buffer analysis for continuous portions of memory;

determining that at least one continuous portion of host buffer memory is sufficient to store one or more control pages requiring fragmentation management;

waiting until an available processing downtime occurs;

swapping, upon available processing downtime, any control page data stored within the continuous portions of host buffer memory with the one or more control pages requiring fragmentation management.

17. The method of claim 16, wherein, upon determining that no continuous portions of the allocated host buffer memory is sufficient to store one or more control pages requiring fragmentation management, the method further:

determines that a continuous portion of unallocated host buffer memory is sufficient to store one or more control pages requiring fragmentation management;

sends a dummy request for a new portion of host buffer memory be allocated sufficient to store the one or more control pages requiring fragmentation management; and copies the one or more control pages requiring fragmentation management to the newly allocated host buffer.

18. The method of claim 17, wherein, upon determining that no continuous portions of the allocated or unallocated host buffer memory is sufficient to store one or more control pages requiring fragmentation management, the method further:

determines at least one set of data relevant to the one or more control pages requiring fragmentation management; and caches the determined set of data to the device.

19. A device comprising:
   a processor;
   a memory array comprising a plurality of non-volatile memory devices; and
   a host buffer management logic configured to:
      establish a communication link with a host device;
      obtain access to one or more host buffers;
      utilize the one or more host buffers for processing a plurality of buffer data of one or more of the plurality of non-volatile memory devices; monitor the usage of the one or more host buffers;
      determine that a portion of the plurality of buffer data requires fragmentation management wherein the fragmentation management comprises one or more operations to minimize negative effects on the determined one or more portions of the plurality of buffer data due to fragmentation;
      search the one or more host buffers for continuous portions of allocated or unallocated memory sufficient to store non-fragmented portions of the plurality of buffer data requiring fragmentation management;
   perform a first series of fragmentation management operations on at least a portion of the plurality of buffer data in response to a portion of allocated memory being found; and
   perform a second series of fragmentation management operations on at least a portion of the plurality of buffer data in response to no portions of allocated memory being found and a portion of unallocated memory being found.

\* \* \* \* \*